(12) United States Patent
Bouet

(10) Patent No.: US 6,879,810 B2
(45) Date of Patent: Apr. 12, 2005

(54) CONTROL OF SHORT RANGE RF COMMUNICATION

(75) Inventor: Stephane Bouet, Tokyo-To (JP)

(73) Assignee: Nokia Corporation, Espoo (FI)

( * ) Notice: Subject to any disclaimer, the term of this patent is extended or adjusted under 35 U.S.C. 154(b) by 712 days.

(21) Appl. No.: 09/739,690

(22) Filed: Dec. 20, 2000

(65) Prior Publication Data

US 2002/0077139 A1 Jun. 20, 2002

(51) Int. Cl.$^7$ ................................................ H04B 7/00
(52) U.S. Cl. .................... 455/41.2; 455/411; 455/500; 455/41.3
(58) Field of Search .................. 455/41.2, 88, 418, 455/419, 420, 552.1, 411, 517, 41.1, 522, 500, 41.3

(56) References Cited

U.S. PATENT DOCUMENTS

| | | | |
|---|---|---|---|
| 4,528,643 A | | 7/1985 | Freeny, Jr. |
| 5,440,559 A | * | 8/1995 | Gaskill ........................ 370/314 |
| 5,701,329 A | | 12/1997 | Croft et al. |
| 5,797,085 A | * | 8/1998 | Beuk et al. .................... 455/88 |
| 5,907,418 A | * | 5/1999 | Walczak et al. ............. 398/106 |
| 6,028,866 A | * | 2/2000 | Engel et al. ................. 370/461 |
| 6,373,791 B1 | * | 4/2002 | Ukita et al. ..................... 369/6 |
| 6,640,098 B1 | * | 10/2003 | Roundtree ................ 455/414.2 |

OTHER PUBLICATIONS

"Bluetooth Specification Version 1.0B, Core: Channel Control" Bluetooth Specification Version 1.0B, vol. 1, Dec. 1, 1999, pp. 95–126, XP002174708 the whole document.
"Bluetooth Specification Version 1.1, Core: Packets, Available From Internet:<URL: http://www.bluetooth.com/pdf/bluetooth_11_Specifications_book.pdf>" Bluetooth Specification Vesion 1.1, Feb. 22, 2001, pp. 47–51, XP002206504 the whole document.

* cited by examiner

Primary Examiner—Temica M. Davis
(74) Attorney, Agent, or Firm—Antonelli, Terry, Stout & Kraus, LLP

(57) ABSTRACT

A method of and a system for controlling low power radio frequency activity of terminals, including a method of selecting and activating a wireless terminal. A signal, including a transmission indication, is transmitted by a first terminal. A second terminal receives the signal a number of times and compares the received transmission indications with predetermined indication values. When the comparison shows that a predetermined number of satisfactory transmission indications have been received by the second terminal, the second terminal commences transmission. The transmission indication can be messages having tail portions with a preselected set of states.

72 Claims, 10 Drawing Sheets

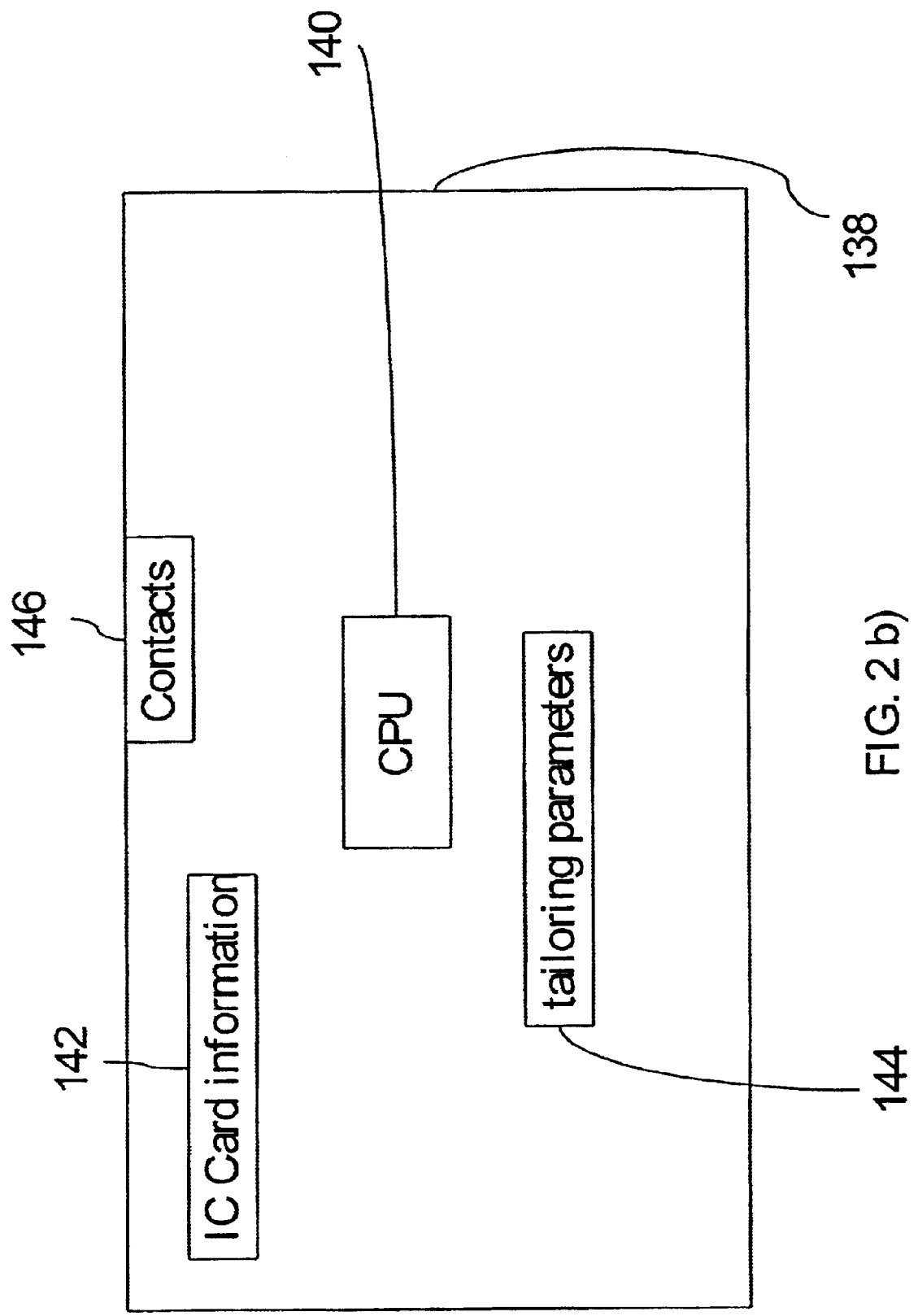

US 6,879,810 B2

CONTROL OF SHORT RANGE RF COMMUNICATION

FIELD OF THE INVENTION

This invention relates to the field of communication and, more precisely to short range RF communication between transceivers.

DESCRIPTION OF RELATED ART

Recently, low power RF systems have been proposed for providing communication between a plurality of transceivers through a short-range communication link. One such short-range RF technology is referred to as "Bluetooth", details of which can be found in "Specification of the Bluetooth System," available on the Internet at www.bluetooth.com. The Bluetooth system will be commercially available in the near future. It operates in the open spectrum around 2.45 GHz. This unlicensed radio band, called Industrial, Scientific, Medical (ISM) band, is globally available. The operating range of this RF system is approximately 10 meters for a normal power mode, and it has proven to be economically efficient.

Depending on the available bandwidth of the country (in Europe and US a bandwidth of 83.5 MHz is available, which is wider than the band available in Japan, Spain and France) either 79 or 23 available RF channels may be used, the channel separation being 1 MHz. The channel is represented by a pseudo-random hopping sequence hopping through the 79 or 23 available RF channels. The hopping is unique in a small area called a piconet. One of the Bluetooth devices in the piconet functions as a master, the other devices being slaves. The hopping is determined by the Bluetooth device address of the master. Each channel is further divided into time slots, each 625 µs in length. In the time slots the master and slave can transmit packets. A Bluetooth chip having these characteristics is to be provided in all kinds of electrical devices to enable communication between separate devices.

In PCT WO publication 0018025, such a Bluetooth link between a Bluetooth enabled mobile terminal and a Bluetooth enabled data terminal, such as a PC, is disclosed.

The wireless or wire lined terminals including a Bluetooth chip and having capability to transmit and receive information according to the Bluetooth protocol as specified in the Bluetooth standard can include a personal computer, a portable phone such as a GSM, IS-136, GPRS or 3G phone, or a personal digital assistant capable of connecting to the Internet wirelessly or having a wired connection via an access provider unit, as well as any other terminal device having a Bluetooth chip and supporting the Bluetooth protocol or some other short range RF method. Any of these devices might be used as a terminal to which the present invention can be applied.

Although devices using Bluetooth technology are considered to be less intrusive to surrounding devices or equipment than, for example, GSM phones, there still exists a need for a method to control the Bluetooth activity of such devices. Further, there is a need to restrict the operation of Bluetooth enabled devices in sensitive environments, such as aircraft, hospitals etc. An additional problem is for the service provider to have confidence that the content is delivered to a device that has the relevant rights.

SUMMARY OF THE INVENTION

The present invention is a method of controlling the low power RF activity of devices, and a system and method enabling a low power RF (LPRF) enabled device to send a specific signal to other LPRF enabled devices informing that it is appropriate for those other devices to be LPRF active that is to start inquiring, paging of other LPRF enabled devices, or responding to inquiries and pages. It is an additional object of the invention to provide such a system which can support existing devices, as well as new devices that include enhanced baseband functionality for controlling LPRF activity.

In the Bluetooth specification, the only way to prevent a Bluetooth device from being RF active is to put it in a non-discoverable, non-connectable mode, and not to attempt to connect with any other Bluetooth device. This invention provides control over the RF activity of the Bluetooth terminal in which the terminals are put in a non-connectable, non-discoverable mode, so that they are impervious to the inquiries or pages coming from other surrounding normal Bluetooth devices but have the ability to receive an authorization that allows them to respond to inquiries or pagings coming from Bluetooth devices that implement this invention, or even initiate inquiries and pagings themselves. In order to let a device know that it is permitted to transmit, while keeping the ability to perform device type selection as defined in the Bluetooth specification, another "channel", that is another piece of data, is used before the Bluetooth activity starts on the receiving device. This channel is provided by the structure of the trailer of the ID packet itself. This trailer serves as an indicator for transmission authorization. The Bluetooth device remains in a non-discoverable and non-connectable mode until the transmission authorization indication is identified.

BRIEF DESCRIPTION OF THE DRAWINGS

Other objects and features of the present invention will become apparent from the following detailed description and claims, particularly when considered in conjunction with the accompanying drawings. It is to be understood, however, that the description and drawings are solely for purposes of illustration and are not a definition of the limits of the invention. It should be further understood that the drawings are not necessarily drawn to scale and that, unless otherwise indicated, they are merely intended to conceptually illustrate the structures and procedures described herein. Thus, the present invention is further described in the detailed description and drawings of non-limiting examples of embodiments of the present invention. In the drawings like reference numerals represent similar parts throughout the several views. In the drawings:

DETAILED DESCRIPTION OF PREFERRED EMBODIMENTS

One of the embodiments of the present invention is directed especially for RF interference sensitive environments, such as aircraft and hospitals. The ability to utilize the non-intrusiveness of LPRF devices in such a sensitive environment is a significant advantage from technical and user points of view. The present invention provides such a capability and can support existing devices as well as new terminals, including enhanced baseband functionality that make is possibly to control the LPRF activity of other units.

Figure 1:
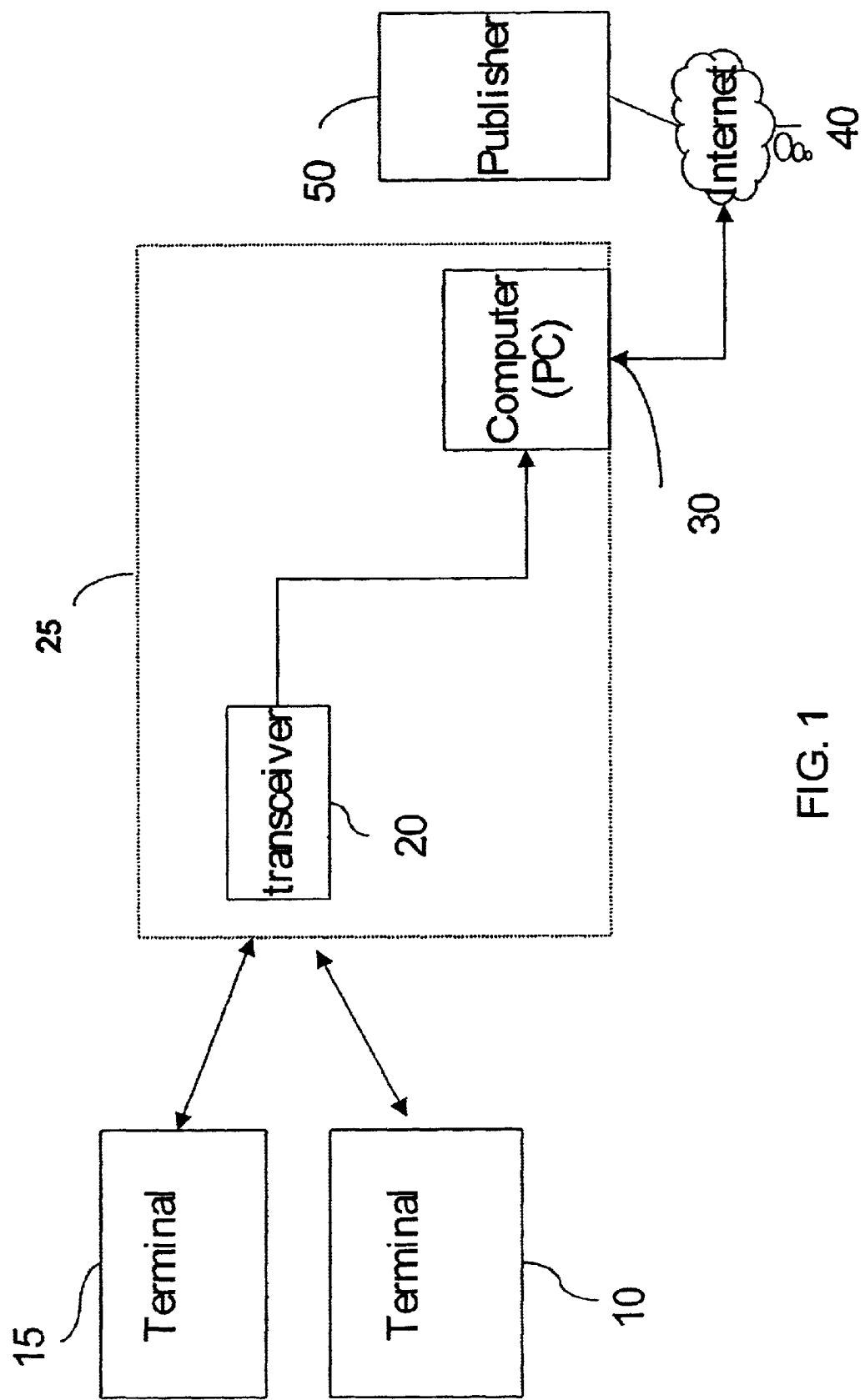
FIG. 1 is a block diagram of a communication system in which the present invention can be incorporated.

FIG. 1 shows a first terminal 10 which includes Bluetooth circuitry and functional logic according to the Bluetooth specification, and so is capable of transmitting via a low power RF as specified in Bluetooth specification and capable of authorizing Bluetooth transmission by other devices. A transceiver 20 and a computer 30, such as a personal computer, function together as a second terminal or an access point 25. Third terminal 15 is a client terminal that can not provide Bluetooth transmission unless authorized to do so by another terminal. Each of the terminals 10, 15 includes Bluetooth circuitry and control block of the Bluetooth protocol.

The first terminal 10 is a slave terminal. The second terminal or access point 25, is a master terminal and connected to a network, such as the Internet 40, through which connection can be made to service providers, such as a publisher 50 from which published products may be offered to paying or otherwise authorized customers. FIG. 1 depicts the second terminal or access point 25 as having a wired connection to the Internet, but the network connection can be also wireless, such as a broadcasting connection, a wireless local area network (WLAN) connection, for example ADSL (Asymmetric Digital Subscriber Line) including a radio network access point capable of radio communication towards the terminal.

Figure 2:
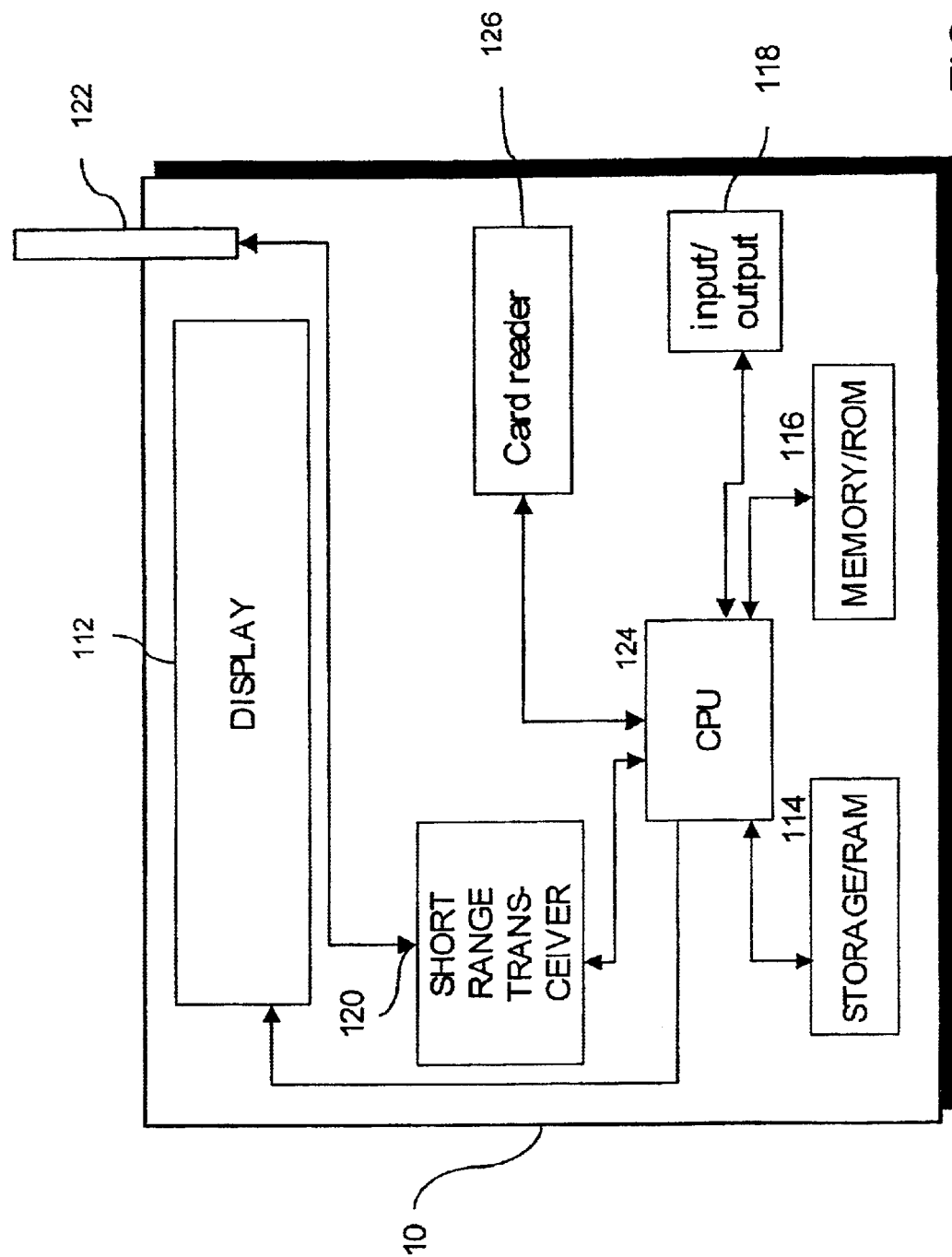
FIG. 2a) is a block diagram of a terminal device in accordance with an embodiment of the invention.
FIG. 2b) is a block diagram of an integrated circuit card in accordance with an embodiment of the invention.

Each of the first terminal 10 and the third or client terminal 15 is a wireless terminal, such as a wireless phone, that includes a low power radio transceiver and low power radio transfer capability. FIG. 2a) depicts the terminal 10, 15 more closely in a block diagram. The terminal includes a display 112, a RAM 114, a ROM 116, an input/output (I/O) unit 118, which might include a keypad for example for entering text etc., a RF transceiver 120 for communication with other transceivers, for example transceiver 20 in access points 25, an antenna 122, and a controller or CPU 124 for controlling the various functions of the terminal. Transceiver 120 is a short-range transceiver for low power radio reception and transmission in the radio spectrum range as specified for example in the Bluetooth specification. A conventional keypad is not necessary, since in the preferred embodiment, the user only needs to accept downloading, make selections from the downloaded items, and possibly browse in the downloaded information. Thus, instead of a keypad, only a key with the functionality to control the above operations is enough. Further, the terminal may have a card reader 126. CPU 124 is connected to display 112, RAM 114, ROM 116, I/O unit 118, transceiver 120, and card reader 126. Additionally, the terminal typically includes a battery pack, (not shown). Preferably, but not necessarily, the transceiver 120 enables short range, low power RF communication, like Bluetooth, with the access point 25. The terminal 10 may have a slot (not shown) for insertion of an integrated circuit card, such as a smart card, into card reader 126. Access point 25 can be similarly constructed, if desired.

FIG. 2b) depicts a card 138, such as a smart card, which includes a CPU 140, a smart card identification code such as a serial number 142, a tailoring parameters register 144, and contacts 146 for enabling a link between the card reader 126 and card 138. When a request for goods/services delivery is placed in the terminal, the terminal has the ability to accept or refuse the request. The validity time of the smart card may be checked with a validity register and with a smart card maintenance and validity table that may be located in access point 25 of the service provider or content provider. The card validity might be based on a fee that has been paid.

Smart cards have been manufactured and are commercially available from several companies, including GEM-PLUS Card International, Avenue du Pic de Bertagne, Parc d'activites de la Plaine de Jouques, 13420 Gemenos, France.

Figure 3A:
FIG. 3a) is a diagram of a standard packet format that is transferred over the air.
Figure 3:
FIG. 3b) is a diagram of a packet format including an access code in accordance with one embodiment of the invention FIG. 3c) is a diagram of a packet filled as known in the prior art.
Figure 3:
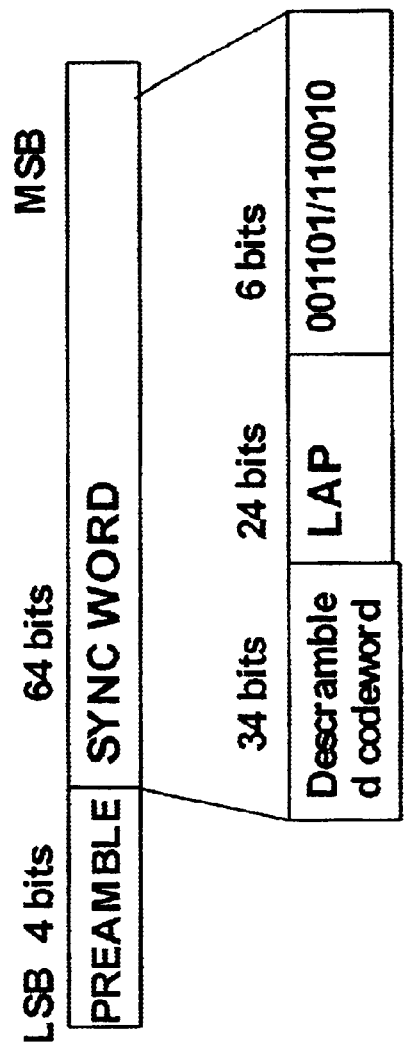

FIG. 3a) depicts the generic format of the packets that are transmitted between two terminals capable of low power radio transfer according to the Bluetooth information transfer scheme, described in the Bluetooth specification. Each packet consists of three parts—an access code, a header, and a payload. The access code and header are of fixed size—72 bits and 54 bits, respectively. The payload may vary from zero to a maximum of 2745 bits. Different packet types have been defined for use with different payloads and links, including synchronous connection-oriented, (SCO) link; symmetric point-to-point between the master and a specific slave terminal, or Asynchronous connection-less (ACL) link; and asymmetric point-to-multipoint link between the master and all slave terminals. Packets may consist of the access code only, such as an Identity (ID) packet, the access code and the header, or the access code, the header and the payload.

FIG. 3b) depicts an ID packet, also known as an Identity Packet. Inquiry procedures, as well as the paging procedures, are carried out before any Bluetooth piconet is formed between two terminals 10, 25 and between terminals 10, 15. The access code is used in paging and inquiry procedures. Before Bluetooth transmission including payload and header information takes place, the access code is sent at an inquiry request stage. FIG. 3c) depicts in greater detail the ID packet including only the access code. The access code consists of a preamble, a sync word, and possibly a trailer. The Inquiry Access Code (IAC) is sent from the master terminal 25 to the slave terminal 10 at regular intervals. The IAC message does not include the trailer, and so the message content is 68 bits long. Different access code types, such as Channel Access Code (COC), Device Access Code (DAC), General Access Code (GIAC), and Dedicated Access code (DIAC), use different Lower Access Parts (LAPs) to construct the synchronization (sync) word. The LAP is the 24 lowest bits of a unique 48-bit Bluetooth device address (BD_ADDR). The device access code is used during paging, page scanning and page response subsets. The LAPs, when used in inquiry packets, are used as device type identifiers, that is to identify the type of device that should reply to the inquiry request messages.

A GIAC is used for general inquiry operations. The IAC type access code is significant because it is used to determine which other Bluetooth units are in the operating range of a master Bluetooth device.

Figure 4:
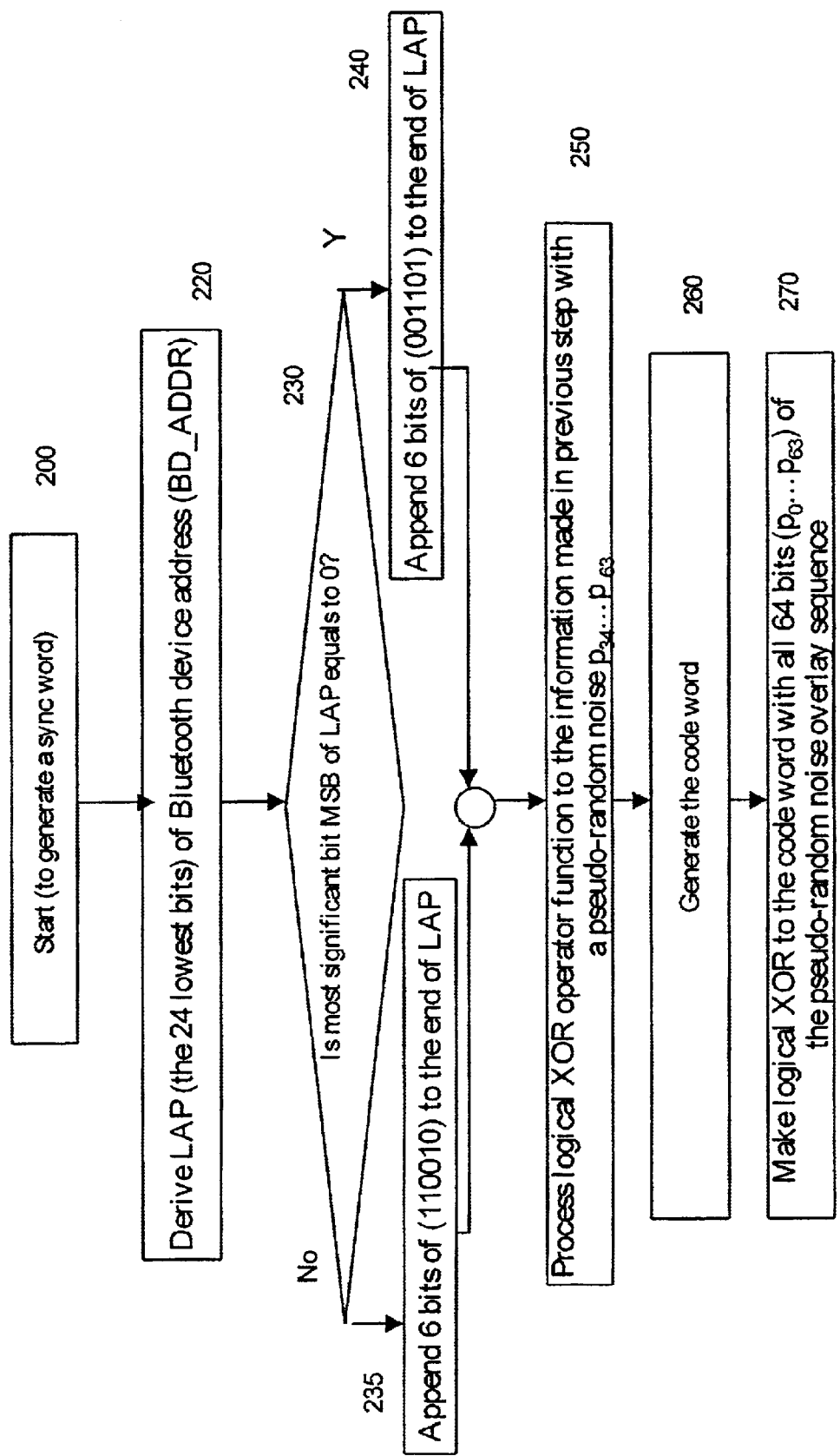
FIG. 4 is a flowchart of a method of generating a sync word of an access code in accordance with an embodiment of the invention.

According to the Bluetooth standard, described in the Bluetooth Specification, and as shown in FIG. 4, a 64 bit long sync word is derived that is required, for example, for the access code. The process starts in step 200, and in step 220 a 24 bit address (the LAP) is generated. In step 230, the parity of the most significant bit of the LAP is determined; that is, it is determined whether the most significant bit is 0 or 1. In either step 235 or step 240 a 6 bits trailer is added to indicate the parity of the most significant bit of the LAP. The trailer is of the value 001101 if the most significant bit of the LAP is 0 (step 240) or of the value 110010 in the opposite case (step 235).

An expurgated 32 bit sequence is added at the head of the sync word in step 250, resulting in a code word at step 260. This is overlaid with a pseudo random 64 bit sequence at step 270. The inquiry process itself consists of a succession of identical ID packets.

The sync words are based on a (64,30) expurgated block code which is generated at step 250 with an overlay (bit-wise XOR) of a 64 bit full-length pseudo-noise PN-sequence (step 270). The expurgated code guarantees a large Hamming distance between sync words based on different addresses, thus enabling better error-control in radio link reception in an environment including radio disturbance. The pseudo-noise, PN sequence improves the auto-correlation properties of the access code.

Figure 5:
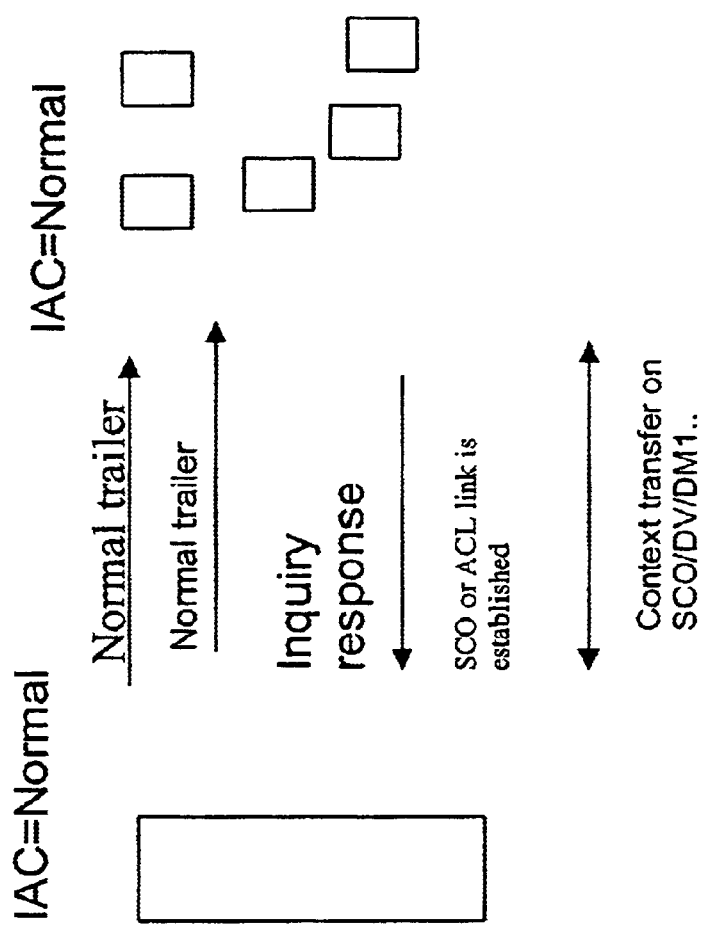
FIG. 5 is a messaging sequence diagram that shows transmission enabled in a slave terminal according to the Bluetooth standard.

FIG. 5 illustrates a basic identification (ID) inquiry in which the recipient slave terminal has no restrictions in answering inquiry requests. The left most device is the master device, and the recipient slave device is on the right. The IAC is used to discover whether other Bluetooth units are in the operating range of a master Bluetooth device. LAPs, when used in inquiry packets, are device type identifiers, used to identify the type of device that should reply to the inquiry request messages.

According to an embodiment of the invention using the LAPs as a parameter to authorize/forbid Bluetooth RF activity on a device is equivalent to defining the "RF Activity Controlled Device" type of device, which would deprive from the ability to select devices using the classes provided by the Bluetooth specification, such as generic access devices, limited access devices, etc.

Figure 6:
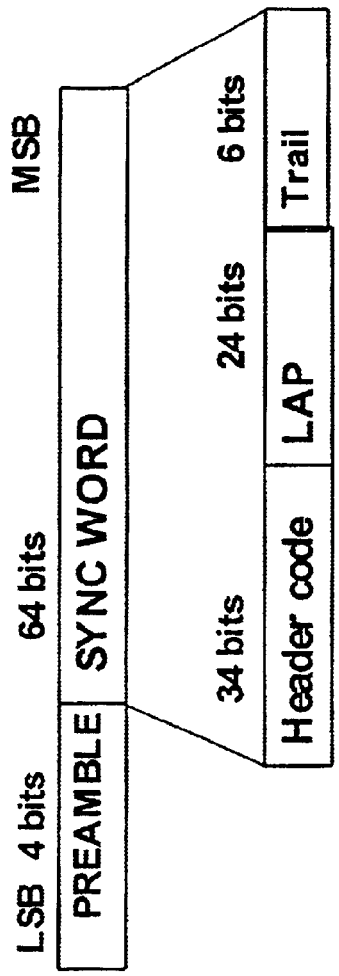
FIG. 6a) is a diagram of the $(2n)^{th}$ ID packet filled according to an embodiment of the invention.
FIG. 6b) is a diagram of the $(2n+1)^{th}$ ID packet filled according to an embodiment of the invention.
Figure 6:
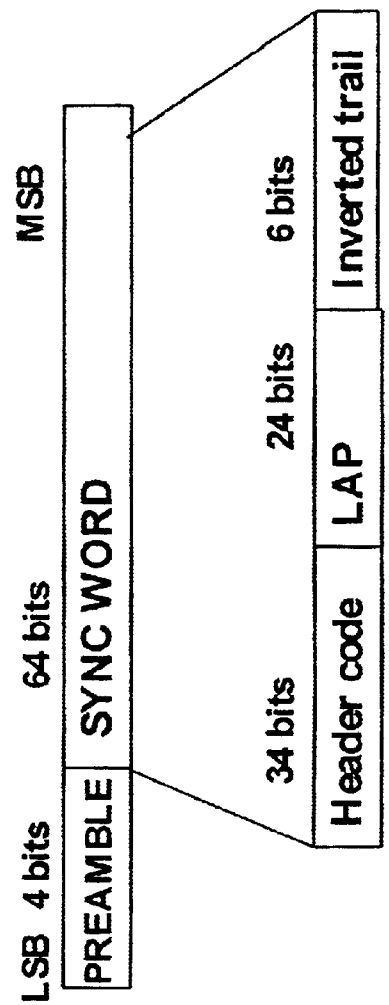

In order to let a device know that it is acceptable to transmit, while keeping the ability to perform device type selection as defined in the Bluetooth specification, it is necessary to find another "channel", that is another piece of data that can be used before the Bluetooth activity starts on the receiving device. This channel is provided by the structure of the ID packet itself. FIGS. 6a) and 6b) depict the ID packet structure according to an embodiment of the invention. To indicate to a Bluetooth device that it is all right to be Bluetooth active, that is, that the device can be active, successive ID packets are modified in the following way: The $(2n)^{th}$ ID packet that is transmitted is depicted in FIG. 6a) and has a 001101 bit sequence as a trailer if the most significant bit of the IAC (which is the most significant bit of the LAP) is 0 and has a 110010 bit sequence in the opposite case. The $(2n+1)^{th}$ ID packet that is transmitted is depicted in FIG. 6b) and has 110010 as a trailer if the most significant bit of the IAC (and the LAP) is 0 and has 001101 as a trailer in the opposite case. Thus, the trailer of the $(2n+1)^{th}$ ID packet is the opposite of the trailer of the $(2n)^{th}$ ID packet.

Figure 7A:
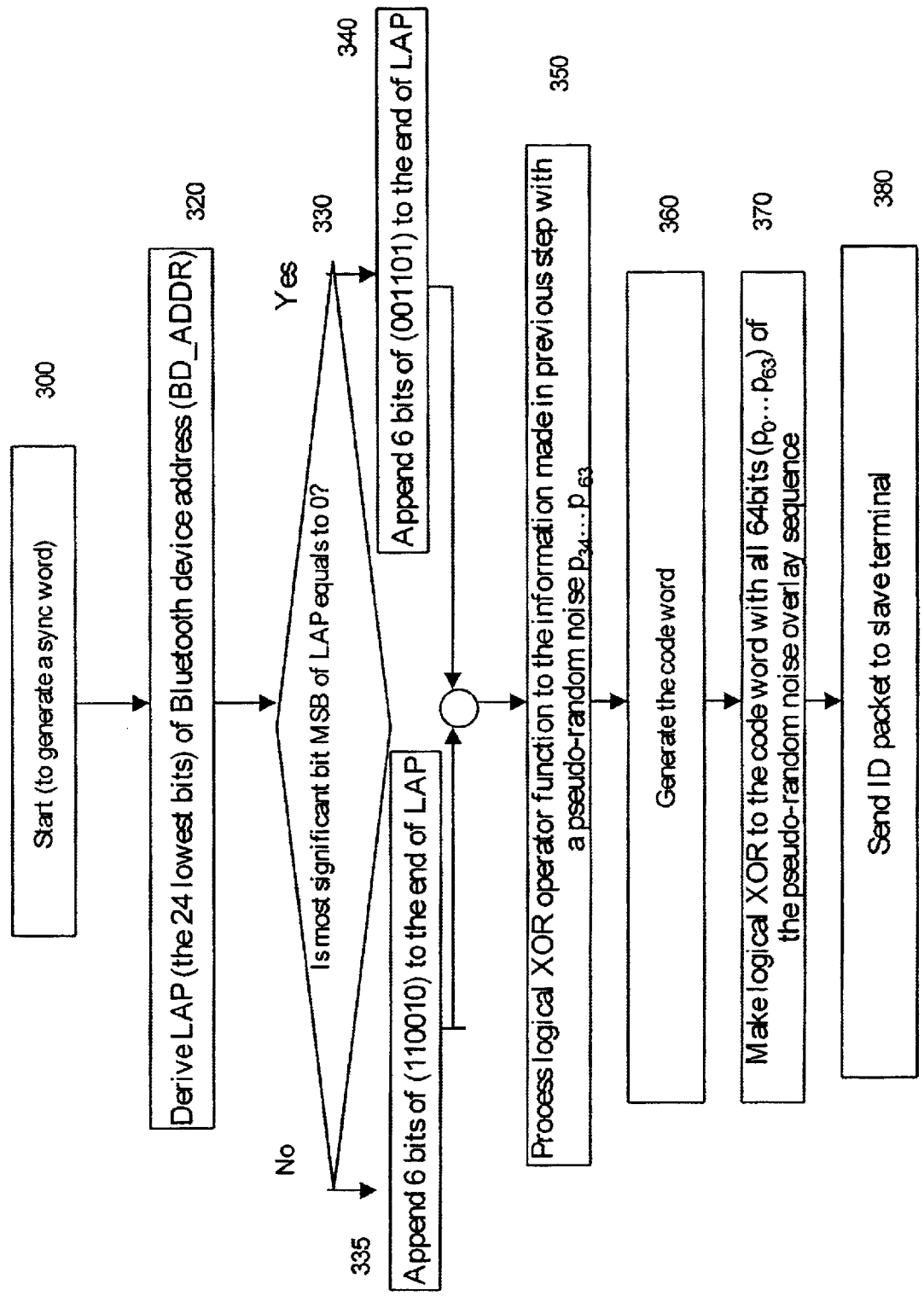
FIG. 7a) is a flowchart of a method of generating a sync word of the access code of the $(2n)^{th}$ ID packet, which enables the transmission of the slave terminal, in accordance with an embodiment of the invention.
Figure 7:
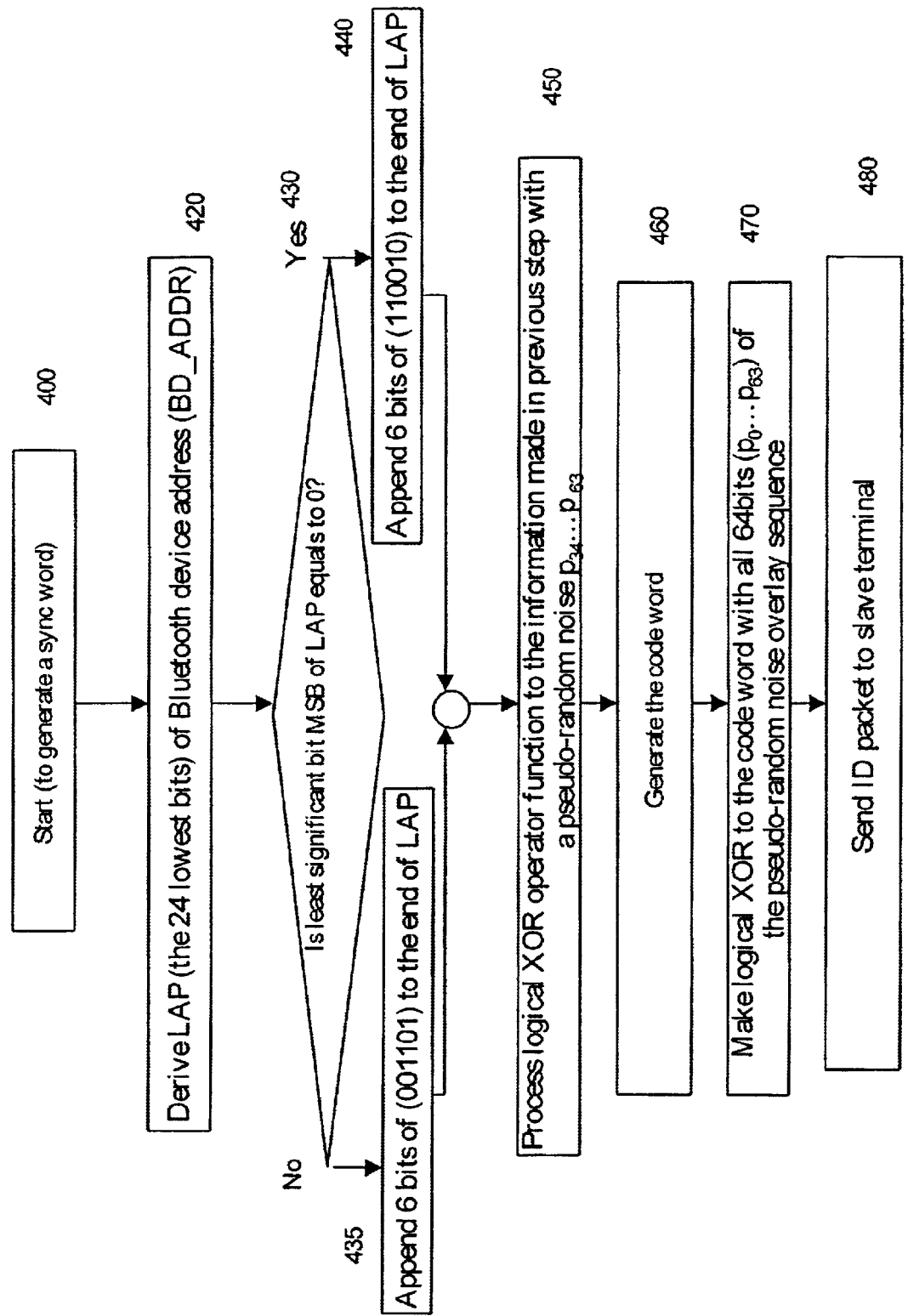
FIG. 7b) is a flowchart of a method of generating a sync word of the access code of the $(2n+1)^{th}$ ID packet, which enables the transmission of the slave terminal, in accordance with an embodiment of the invention.

FIG. 7a) is a flowchart of a method in accordance with an embodiment of the invention for generating a sync word of the access code (ID packet) of the $(2n)^{th}$ ID packet, which enables the transmission of the slave terminal. This method is the same as that of FIG. 4, with the addition of step 380 in which the master terminal 25 sends the just created $(2n)^{th}$ ID Packet to the slave terminal, for example the first terminal 10.

FIG. 7b) is a flowchart of a method according to an embodiment of the invention for generating a sync word of the access code (ID packet) of the $(2n+1)^{th}$ ID packet, which enables the transmission of the slave terminal. This method differs from that of FIG. 7a) for generating a sync word of the access code of the $(2n)^{th}$ ID packet by interchanging the 6 bit trailer code appended in steps 435 and 440, in comparison with steps 335 and 340. The inversion of trailer part has no unwanted impact on the Hamming distance between resulting ID packets in the sense that the minimum Hamming distance between a LAP with an even most significant bit and a LAP with an odd most significant bit is still 6.

Figure 8:
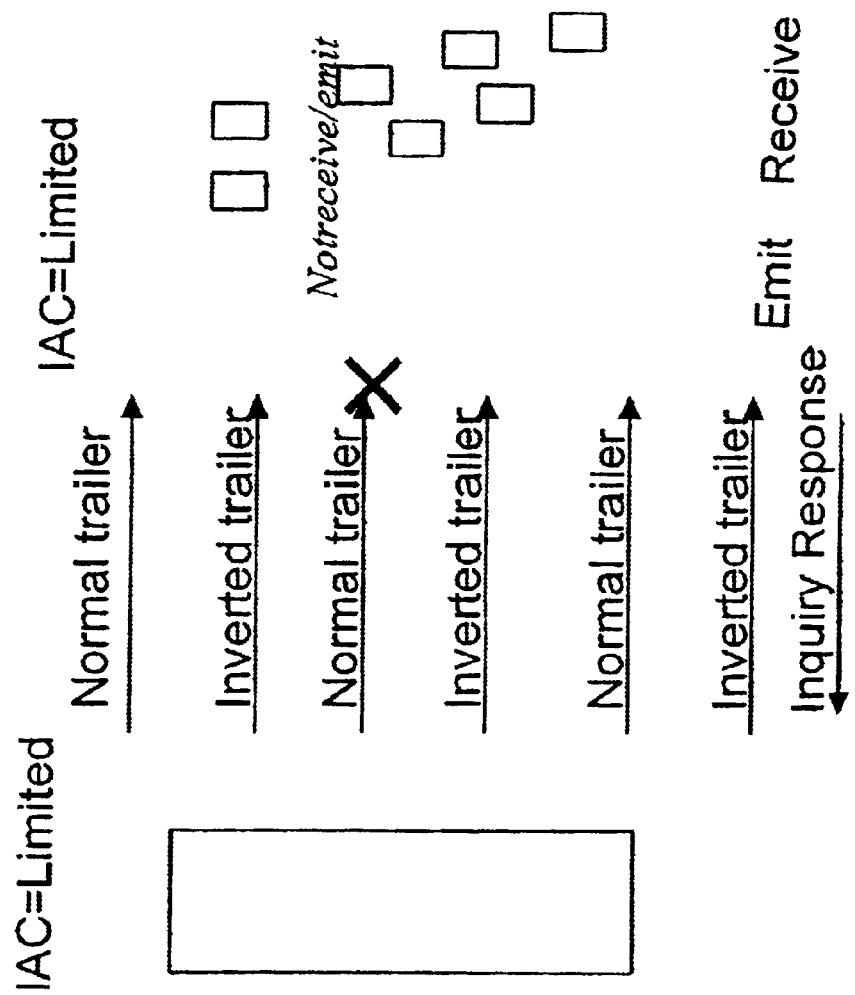
FIG. 8 is a messaging sequence diagram that shows transmission in a slave terminal in accordance with the present invention.

The ID inquiry message is sent from the master transceiver to the slave terminal. The $(2n)^{th}$ and $(2n+1)^{th}$ ID packet pair are received a number (m+1) times. For example, if m=2, the first ID packet pair is $M_0$, the second pair $M_1$, and the third pair $M_2$. Then the slave terminal can make an Inquiry response. This is shown in FIG. 8 in a signalling chart presentation. The receiving device is allowed to transmit only from the moment it has received and detected (m+1) ID packets with the normal trailer scheme and (m+1) ID packets with the opposite trailer scheme. The parameter (m) has a constant value that can be chosen depending on the probability of packet corruption or reception error in the environment in which the procedure is to take place.

FIGS. 7a) and 7b) illustrate the method by which the master transceiver generates the $(2n)^{th}$ ID packet (FIG. 7a) add the $(2n+1)^{th}$ ID packet in (FIG. 7b) in such a way, that the slave terminal is disabled to transmit anything. The next pair of ID packets is transmitted according to the method as described in the flowchart of FIG. 7a). The next two ID packet pairs after the previous packet may be created by the method to generate (by the master transceiver) the $(2n)^{th}$ ID packet (FIG. 7a) and the $(2n+1)^{th}$ ID packet in (FIG. 7b).

FIG. 8 illustrates a method for the master transceiver (on the left hand side in the drawing) to generate the $(2n)^{th}$ ID packet and the $(2n+1)^{th}$ ID packet in such a way that the slave terminal (on the right hand side in the FIG. 8) is enabled to transmit. It is possible that after the ID inquiry message is sent from the master transceiver to the slave terminal (m+1) times, succeeding ID packets are arranged in the following way: the $(2n)^{th}$ immediately precedes the $(2n+1)^{th}$ ID packet in which the trailer is inverted when compared to the $(2n)^{th}$ trailer, and the ID packet pairs are (m+1) times. For example m=2, meaning that after the first ID packet pair $M_0$, the second pair $M_1$ and the third pair $M_2$, the slave terminal can make an Inquiry response.

The baseband section and protocol of the Bluetooth transceiver do the point-to-point or point-to-multipoint transmission link control and use lower protocol layer link routines. The baseband specification of the Bluetooth procedure is described in the Bluetooth specification.

In inquiry procedures, the device about to become the master sends in the inquiry request message an access code that consists of the Lower Address Parts (LAPs) encapsulated in the ID packets. The LAPs, when sent in inquiry packets, are used as device type identifiers, that is to identify the type of device that should reply to the inquiry request messages. At this stage and according to the Bluetooth specification, devices that are of the relevant type start RF activity and answer back with a Frequency Hopping Spread Spectrum (FHSS) packet that carries information such as the baseband address or the clock offset of the responding device.

While there have been shown and described fundamental novel features of the invention as applied to a preferred embodiment thereof, it will be understood that various omissions, substitutions, and changes in the form and details of the devices illustrated, and in their operation, may be made by those skilled in the art without departing from the spirit of the invention. For example, the roles of the master terminal and a slave may be reversed, with either terminal 10 or 15 being the master and terminal 25 being a slave. It is expressly intended that all combinations of those elements and/or method steps, which perform substantially the same function in substantially the same way to achieve substantially the same result, be within the scope of this invention. Moreover, it should be recognised that structures and/or elements and/or method steps shown and/or described in connection with any disclosed form or embodiment of the invention may be incorporated.

The claims:

1. A method for controlling low power radio frequency activity of terminals, said method comprising the steps of:
   transmitting a radio frequency signal from a first terminal communicating with a second terminal, the signal including a transmission indication;
   receiving the transmission indication by the second terminal sequentially a multiple number of times, wherein the transmission indication is a radio frequency transmission authorization indication included in control information which is used to control whether the second terminal is activated to transmit or receive subsequent radio transmissions; and
   comparing the multiple received transmission indications with predetermined indication values; and wherein
   in response to the comparison showing that a predetermined number of satisfactory transmission indications have been received by the second terminal, the second terminal commences the subsequent radio transmissions.

2. A method as claimed in claim 1, wherein a parameter of content of the radio frequency transmission authorization indication of one received message is inverted in relation to a corresponding parameter of content of a previously received message.

3. A method as claimed in claim 1, further comprising the step in the first terminal of counting the radio frequency transmission authorization indications sent to the second terminal.

4. A method as claimed in claim 1, further comprising the step in the second terminal of counting the radio frequency transmission authorization indications received from the first terminal.

5. A method as claimed in claim 1, further comprising the step in the first terminal of comparing the counted even numbered radio frequency transmission authorization indications which are sent to the second terminal.

6. A method as claimed in claim 5, further comprising the step in the first terminal of sending a comparison result to the second terminal when the comparison result is equal to a predetermined value.

7. A method as claimed in claim 1, further comprising the step in the first terminal of comparing the counted odd numbered radio frequency transmission authorization indications which are sent to the second terminal.

8. A method as claimed in claim 7, further comprising the step in the first terminal of sending a comparison result transmission to the second terminal when the comparison result is equal to a predetermined value.

9. A method as claimed in claim 1, further comprising the step in the second terminal of comparing counted even numbered radio frequency transmission authorization indications received from the first terminal.

10. A method as claimed in claim 9, further comprising the step in the second terminal of sending a comparison result to the first terminal when the comparison result is equal to a predetermined value.

11. A method as claimed in claim 1, further comprising the step in the second terminal of comparing counted odd numbered radio frequency transmission authorization indications received from the first terminal.

12. A method as claimed in claim 11, comprising the step in the second terminal of sending a comparison result to the first terminal when the comparison result is equal to a predetermined value.

13. A method as claimed in claim 1, further comprising downloading a content product to a memory in the second terminal.

14. A method for selecting and activating a wireless terminal, comprising the steps of delivering a series of messages to the wireless terminal, each message including a payload portion in response to which a particular terminal is selected and a tail portion including first and second states, each state being indicative of a corresponding payload condition, the method comprising:
    inverting the tail portion for at least a first one of said series of messages with respect to the tail portion for another one of said series of messages, the wireless terminal being activated in response to said inversion including a first set of states each being indicative of a corresponding payload condition; and
    inverting said first set of states for at least one of said series of messages to provide a second set of states, such that said previously selected terminal is activated in response to changes in said sets.

15. A method for controlling low power radio frequency activity of terminals, said method comprising the steps of:
    transmitting inquiry signals over a lower power radio frequency communication channel by a first terminal, each of the inquiry signals including a dedicated transmission authorization indication;
    receiving the inquiry signals by a second terminal a multiple number of times, wherein received transmission authorization indications a counted by the second terminal;
    comparing the counted received transmission authorization indications with predetermined indication conditions for low power radio frequency communication; and
    in response the comparison indicating that the predetermined conditions for commencing low power radio frequency communication are satisfied, commencing low power radio frequency transmission or reception by the second terminal.

16. A method as claimed in claim 15, wherein a parameter of content of the dedicated transmission authorization indication of one received message is inverted in relation to a corresponding parameter of content of a previously received message.

17. A method as claimed in claim 15, comprising the step in the first terminal of counting the transmission authorization indications sent to the second terminal.

18. A method as claimed in claim 15, comprising the step in the second terminal of counting the transmission authorization indications received from the terminal.

19. A method as claimed in claim 15, comprising the step in the first terminal or comparing counted even numbered transmission authorization indications which are sent to the second terminal.

20. A method as claimed in claim 19, comprising the step in the first terminal of sending a comparison result to the second terminal when the comparison result is equal to a predetermined value.

21. A method as claimed in claim 15, comprising the step in the first terminal of comparing counted odd numbered transmission authorization indications which are sent to the second terminal.

22. A method as claimed in claim 21, comprising the step in the first terminal of sending a comparison result transmission to the second terminal when the comparison result is equal to a predetermined value.

23. A method as claimed in claim 15, comprising the step in the second terminal of comparing counted even numbered transmission authorization indications received from the first terminal.

24. A method as claimed in claim 23, comprising the step in the second terminal of sending a comparison result to the first terminal when the comparison result is equal to a predetermined value.

25. A method as claimed in claim 15, comprising the step in the second terminal of comparing counted odd numbered transmission authorization indications received from the first terminal.

26. A method as claimed in claim 25, comprising the step in the second terminal of sending a comparison result to the first terminal when the comparison result is equal to a predetermined value.

27. A method as claimed in claim 15, comprising downloading a content product to a memory in the second terminal.

28. A system for controlling low power radio frequency activity of terminals, comprising:
a first and a second terminal with the first and second terminals being in communication; and wherein
a radio frequency signals is transmitted from the first terminal communicating with the second terminal, the signal including a transmission indication, the transmission indication is received by the second terminal sequentially a multiple number of times, wherein the transmission indication is a radio frequency transmission authorization indication included in control information which is used to control whether the second terminal is activated to transmit or receive subsequent radio transmissions, the multiple received transmission indications are compared with predetermined indication value, in response to the comparison showing that a predetermined number of satisfactory transmission indications have been received by the second terminal and the second terminal commences the subsequent radio transmissions.

29. A system as claimed in claim 28, wherein a parameter of content of the radio frequency transmission authorization indication of one received message is inverted in relation to a corresponding parameter of content of a previously received message.

30. A system as claimed in claim 28, wherein the first terminal counts the radio frequency transmission authorization indications sent to the second terminal.

31. A system as claimed in claim 28, wherein the second terminal counts the radio frequency transmission authorization indications received from the first terminal.

32. A system as claimed in claim 28, wherein the first terminal compares counted even numbered radio frequency transmission authorization indications which are sent to the second terminal.

33. A system as claimed in claim 32, wherein the first terminal sends a comparison result to the second terminal when the comparison result is equal to a predetermined value.

34. A system as claimed in claim 28, wherein the first terminal compares counted odd numbered radio frequency transmission authorization indications which are sent to the second terminal.

35. A system as claimed in claim 34, wherein the first terminal sends a comparison result transmission to the second terminal when the comparison result is equal to a predetermined value.

36. A system as claimed in claim 28, wherein the second terminal compares counted even numbered radio frequency transmission authorization indications received from the first terminal.

37. A system as claimed in claim 36, wherein the second terminal sends a comparison result to the first terminal when the comparison result is equal to a predetermined value.

38. A system as claimed in claim 28, wherein the second terminal compares counted odd numbered radio frequency transmission authorization indications received from the first terminal.

39. A system as claimed in claim 38, wherein the second terminal sends a comparison result to the first terminal when the comparison result is equal to a predetermined value.

40. A system as claimed in claim 28, wherein a content product is downloaded to a memory in the second terminal.

41. A system for selecting and activating a wireless terminal, wherein:
a series of messages are delivered to the wireless terminal, each message including a payload portion in response to which a particular terminal is selected and a tail portion including first and second states, each state being indicative of a corresponding payload condition, the tail portion is inverted for at least a first one of said series of messages with respect to the tail portion for another one of said series of messages, the wireless terminal being activated in response to said inversion including a first set of states each being indicative of a corresponding payload condition; and said first set of states for at least one of said series of messages is inverted to provide a second set of states, such that said previously selected terminal is activated in response to changes in said sets.

42. A system comprising:
first and second terminals connected by a low power radio frequency communication channel for controlling low power radio frequency activity of the first and second terminals; and wherein
inquiry signals are transmitted over the lower power radio frequency communication channel by the first terminal, each of the inquiry signals including a dedicated transmission authorization indication, the inquiry signals are received by the second terminal a multiple number of times, wherein received transmission authorization indications are counted by the second terminal, the counted received transmission authorization indications are compared with predetermined indication conditions for low power radio frequency communication, and in response to the comparison indicating that the predetermined conditions for commencing low power radio frequency communication are satisfied and commencing low power radio frequency transmission or reception by the second terminal.

43. A system as claimed in claim 42, wherein a parameter of content of the dedicated transmission authorization indication of one received message is inverted in relation to a corresponding parameter of content of a previously received message.

44. A system as claimed in claim 42, wherein the first terminal counts the transmission authorization indication sent to the second terminal.

45. A system as claimed in claim 42, wherein the second terminal counts the transmission authorization indications received from the first terminal.

46. A system as claimed in claim 42, wherein the first terminal compares counted even numbered transmission authorization indications which are sent to the second terminal.

47. A system as claimed in claim 46, wherein the first terminal sends a comparison result to the second terminal when the comparison result is equal to a predetermined value.

48. A system as claimed in claim 42, wherein the first terminal compares counted odd numbered transmission authorization indications which are sent to the second terminal.

49. A system as claimed in claim 48, wherein the first terminal sends a comparison result transmission to the second terminal when the comparison result is equal to a predetermined value.

50. A system as claimed in claim 42, wherein the second terminal compares counted even numbered transmission authorization indications received from the first terminal.

51. A system as claimed in claim 50, wherein the second terminal sends a comparison result to the first terminal when the comparison result is equal to a predetermined value.

52. A system as claimed in claim 42, wherein the second terminal compares counted odd numbered transmission authorization indications received from the first terminal.

53. A system as claimed in claim 52, wherein the second terminal sends a comparison result to the first terminal when the comparison result is equal to a predetermined value.

54. A system as claimed in claim 52, wherein a content product is downloaded to a memory in the second terminal.

55. In a system for controlling low power radio frequency activity of first and second terminals, the second terminal comprising:

a transceiver; and wherein a radio frequency signal is transmitted from the first terminal to the second terminal, the signal including a transmission indication, the transmission indication being received by the second terminal sequentially a multiple number of times, wherein the transmission indication is a radio frequency transmission authorization indication included in control information which is used to control whether the second terminal is activated to transmit or receive subsequent radio transmissions, the multiple received transmission indications are compared with predetermined indication values, and in response to the comparison showing that a predetermined number of satisfactory transmission indications have been received by the second terminal and the second terminal commences the subsequent radio transmissions.

56. A second terminal as claimed in claim 55, wherein a parameter of content of the radio frequency transmission authorization indication of one received message is inverted in relation to a corresponding parameter of content of a previously received message.

57. A second terminal as claimed in claim 55, wherein the second terminal counts the radio frequency transmission authorization indications received from the first terminal.

58. A second terminal as claimed in claim 55, wherein the first terminal compares counted even numbered radio frequency transmission authorization indications which are sent to the second terminal.

59. A second terminal as claimed in claim 55, wherein the first terminal sends a comparison result to the second terminal when the comparison result is equal to a predetermined value.

60. A second terminal as claimed in claim 55, wherein the first terminal compares counted odd numbered radio frequency transmission authorization indications which are sent to the second terminal.

61. A second terminal as claimed in claim 60, wherein the first terminal sends a comparison result transmission to the second terminal when the comparison result is equal to a predetermined value.

62. A second terminal as claimed in claim 55, wherein the second terminal compares counted even numbered radio frequency transmission authorization indications received from the first terminal.

63. A second terminal as claimed in claim 62, wherein in the second terminal sends a comparison result to the first terminal when the comparison result is equal to a predetermined value.

64. A second terminal as claimed in claim 55, wherein the second terminal compares counted odd numbered radio frequency transmission authorization indications received from the first terminal.

65. A second terminal as claimed in claim 64, wherein the second terminal sends a comparison result to the first terminal when the comparison result is equal to a predetermined value.

66. A second terminal as claimed in claim 55, wherein a content product is downloaded to a memory in the second terminal.

67. A terminal, comprising:

a transceiver;

means for receiving a radio frequency signal via the transceiver, the signal including a transmission indication that is received sequentially a multiple number of times, wherein the transmission indication is a radio frequency transmission authorization indication included in control information which is used to control whether the terminal is activated to transmit or receive subsequent radio transmissions;

means for comparing the multiple received transmission indications with a predetermined indication value; and means for commencing subsequent radio transmission via the transceiver in response to a comparison showing that a predetermined number of satisfactory transmission indications have been received by the terminal.

68. A terminal as claimed in claim 67, wherein a parameter of content of the radio frequency transmission authorization indication of one received message is inverted in relation to a corresponding parameter of content of a previously received message.

69. A terminal as claimed in claim 67, wherein the terminal counts the received radio frequency transmission authorization indications.

70. A terminal as claimed in claim 67, wherein the terminal is a mobile phone.

71. A terminal as claimed in claim 67, wherein the transceiver is a short-range transceiver for low power radio reception and transmission.

72. A terminal as claimed in claim 71, wherein the short-range transceiver conforms the principles of the Bluetooth specification.

* * * * *